(12) United States Patent
Noda et al.

(10) Patent No.: US 7,958,564 B2
(45) Date of Patent: Jun. 7, 2011

(54) SCANNING MEASUREMENT INSTRUMENT

(75) Inventors: Takashi Noda, Utsunomiya (JP);
Hiroshi Kamitani, Utsunomiya (JP);
Naoya Kikuchi, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 352 days.

(21) Appl. No.: 12/388,840

(22) Filed: Feb. 19, 2009

(65) Prior Publication Data
US 2009/0217426 A1   Aug. 27, 2009

(30) Foreign Application Priority Data

Feb. 21, 2008   (JP) ................................. 2008-040059

(51) Int. Cl.
*G01B 5/004* (2006.01)
(52) U.S. Cl. ............... 850/21; 850/10; 850/62; 850/38; 702/150
(58) Field of Classification Search .................. 250/234; 850/21, 10, 62, 38; 702/150, 168
See application file for complete search history.

(56) References Cited

U.S. PATENT DOCUMENTS

| | | | | |
|---|---|---|---|---|
| 5,324,935 A | * | 6/1994 | Yasutake | 250/234 |
| 5,471,406 A | * | 11/1995 | Breyer et al. | 702/168 |
| 5,902,928 A | * | 5/1999 | Chen et al. | 73/105 |
| 6,052,628 A | | 4/2000 | Hong | |
| 6,094,972 A | * | 8/2000 | Yasutake et al. | 73/105 |
| 6,106,471 A | * | 8/2000 | Wiesauer et al. | 600/443 |
| 6,169,281 B1 | * | 1/2001 | Chen et al. | 250/234 |
| 2005/0263727 A1 | | 12/2005 | Noda | |
| 2006/0117587 A1 | | 6/2006 | Lotze | |

FOREIGN PATENT DOCUMENTS

JP   63-131017   6/1988

OTHER PUBLICATIONS

Calculation of the Unit Normal Vector using the Cross-Curve Moving Mask for Measurement Data Obtained from a Coordinate Measuring Machine, Fang-Jung Shiou and Ruey-Tsung Lee, Institute of Physics Publishing, Journal of Physics: Conference Series 48 (2006) 122-127.
G1 continuity of B-spline patches in reverse engineering, M.J. Milroy et al., Computer-Aided Design vol. 27 No. 6 Jun. 1995, 471-478.

* cited by examiner

*Primary Examiner* — Nikita Wells
*Assistant Examiner* — Johnnie L Smith
(74) *Attorney, Agent, or Firm* — Rankin, Hill & Clark LLP

(57) ABSTRACT

A scanning measurement instrument is capable of simultaneously achieving both higher accuracy and higher speed in autonomous scanning measurement. The instrument includes a path information holding unit for holding information about the path of the center position of a tip of a scanning probe at past tip center positions with respect to the current tip center position during autonomous scanning measurement performed with the scanning probe; a path reference direction setting unit for setting an approximate straight line direction of the path as a path reference direction; a traveling direction setting unit for setting the path reference direction as a traveling direction; a movement control unit for controlling a moving unit such that the scanning probe is moved in the traveling direction; and a normal direction setting unit for setting the normal direction of a measurement surface according to the traveling direction.

6 Claims, 14 Drawing Sheets

$m_1 = 2.0 - |E - |E_b|| \times 4/E$

1) $E_b$ : current deflection

2) $E$ : reference deflection

3) $E/5 \leqq E_b \leqq 9E/5$ $$m_2 = (S/S_1)^2$$

1) $S = L/L_0$

2) $L_0$ : specified speed movement distance (each sampling time)

3) $L$ : current speed movement distance (each sampling time)

4) $0.8 \leq S_1 \leq 1.0$

SCANNING MEASUREMENT INSTRUMENT

RELATED APPLICATIONS

This application claims the priority of Japanese Patent Application No. 2008-40059 filed on Feb. 21, 2008, which are incorporated herein by reference.

BACKGROUND OF THE INVENTION

Field of the Invention

The present invention relates to scanning measurement instruments, and more particularly, to an improvement of autonomous scanning control instruments.

PRIOR ART

Scanning measurements have been performed with three-dimensional measurement machines to measure the shape or size of a workpiece by scanning the workpiece while a spherical tip (a contact portion) provided at an end of a stylus of a scanning probe is in contact with the workpiece (see, for example, Japanese Unexamined Patent Application Publication No. Sho-63-131017).

The scanning measurement control function of these three-dimensional measurement machines uses autonomous scanning, which uses an unknown scanning path, and nominal scanning (designed-value scanning), which uses a known scanning path. Autonomous scanning has attracted particular attention because a workpiece with an unknown shape can be automatically measured.

In autonomous scanning measurements, the scanning probe is driven and controlled such that the tip is first made to contact a workpiece, and the stylus, which is supported such that the stylus can be deflected with respect to the probe body along any of the X, Y, and Z axes, is pushed into the probe body by a predetermined distance. Then, the probe body is driven and controlled, that is, the probe body is moved along the surface shape of the workpiece such that the stylus is maintained in position with respect to the probe body. The coordinates of the center of the tip are continuously obtained and recorded as measurement values. During the autonomous scanning measurements, shown by FIG. 4B, the scanning probe is driven and controlled such that the center position of the tip provided at the end of the stylus is always positioned on a virtual scanning restraining section 70 which serves as the target of probe position control, and the scanning traveling direction (P) is determined by the outer product ($P_b$) of the normal vector (H) of the scanning restraining section 70 and a vector ($E_b$) in the probe deflection direction in which the stylus is pushed into the probe body.

Higher accuracy and higher speed are demanded in autonomous scanning measurements. To satisfy the demand, conventionally, the scanning probe is moved at a low speed for high-accuracy measurement and is moved at a high speed when high-accuracy measurement is not required, depending on the objective of the measurement and the shape of the workpiece.

In other words, both higher accuracy and higher speed are not simultaneously achievable in measurements with the conventional autonomous scanning measurement control method. For example, when the scanning probe is moved at a high speed to perform scanning measurement quickly, the scanning probe may be pushed to or separated from the measurement surface more than needed, causing probe deflection out of the permissible range, thus making scansing measurement impossible. Therefore, it has been strongly demanded that both accuracy and speed be simultaneously satisfied in autonomous scanning measurements.

SUMMARY OF THE INVENTION

In view of the above-described situation, the present invention has been made. Accordingly, it is an object of the present invention to provide a scanning measurement instrument capable of achieving both higher accuracy and higher speed in autonomous scanning measurements.

Through repeated examinations of autonomous scanning measurement control, the present inventors found that it was conventionally difficult to simultaneously satisfy both high accuracy and high speed in scanning measurements because the scanning traveling direction (P) was not accurately obtained.

Conventionally, in autonomous scanning, the scanning traveling direction (P) is obtained from the direction of a vector ($P_b$) calculated as the outer product of the normal vector (H) of a scanning restraining section specified in advance and a vector ($E_b$) in the probe deflection direction.

Because the normal direction (H) of a scanning restraining section is specified in advance and is fixed, the scanning traveling direction (P) is influenced by the probe deflection direction ($E_b$). In autonomous scanning measurement with a three-dimensional measurement machine, it is usually assumed that the probe deflection direction ($E_b$) matches the normal direction of the measurement surface.

However, the probe deflection direction ($E_b$) actually may not match the normal direction of the measurement surface due to friction between the scanning probe and the measurement surface or bending of the stylus of the scanning probe.

Even when the friction or bending described above does not have any effect, if the scanning probe has a small permissible range of probe deflection, such as ±0.15 mm, the probe deflection may be out of the permissible range even at positions having small radii of curvature.

In addition, some types of scanning probes are easily influenced by friction due to the surface condition of the workpiece, depending on the deflection direction. Therefore, the scanning traveling direction (P) is not accurately obtained, making high-speed scanning measurement impossible.

The present inventors found that both higher accuracy and higher speed in autonomous scanning measurements can be simultaneously achieved with reliability, which was very difficult to achieve conventionally, by determining the scanning traveling direction (P) in the following way to complete the present invention. This is based on the finding, which was conventionally unknown, that the scanning traveling direction (P) is not accurately obtained, making it impossible to satisfy both higher accuracy and higher speed simultaneously in autonomous scanning.

To achieve the foregoing object, the present invention provides a scanning measurement instrument including a scanning probe in which the deflection of a stylus having, at an end, a spherical tip that contacts a workpiece can be detected, and performs autonomous scanning measurement while making the tip contact a measurement surface of the workpiece. The scanning measurement instrument further includes a deflection detection unit, a moving unit, a movement distance detection unit, a data processor, a path information holding unit, a path reference direction setting unit, a traveling direction setting unit, a movement control unit, and a normal direction setting unit.

The deflection detection unit detects the deflection of the stylus with respect to a probe body.

As the scanning probe and the deflection detection unit, a probe shown in FIG. 3 in Japanese Unexamined Patent Application Publication No. Sho-63-131017 can be used.

As the scanning probe of the present invention, a scanning probe of either a type using probe deflection distance constant control or a type using measurement pressure constant control can be used.

The moving unit moves the workpiece and the scanning probe relative to each other such that the contact position of the measurement surface and the tip is moved along the measurement surface.

The movement distance detection unit detects the movement distance of the scanning probe moved by the moving unit.

The data processor calculates the coordinates of the center position of the tip according to the movement distance of the scanning probe detected by the movement distance detection unit and the deflection of the stylus detected by the deflection detection unit.

The path information holding unit holds information about the path of the center position of the tip during the autonomous scanning measurement performed with the scanning probe. The path are, with respect to the center position of the tip, from the center position of the tip immediately before the current center position, to the center position of the tip located a predetermined measurement pitch before the current center position, in the direction opposite the movement direction of the scanning probe.

The path reference direction setting unit calculates an approximate straight line direction from the information about the path of the center position of the tip stored in the path information holding unit to set the direction as a path reference direction ($P_a$).

The traveling direction setting unit sets, as the traveling direction (P) of the scanning probe, the path reference direction ($P_a$) set by the path reference direction setting unit.

The movement control unit controls the relative movement of the scanning probe moved by the moving unit such that the scanning probe is moved in the traveling direction (P) set by the traveling direction setting unit.

The normal direction setting unit sets the normal direction (E) of the measurement surface according to the direction of a vector obtained from the outer product of a vector indicating the traveling direction (P) set by the traveling direction setting unit and a normal vector (H) of a scanning restraining section specified in advance.

In the present invention, it is preferred that the data processor apply offset processing according to the radius of the tip to the coordinates of the center position of the tip in the normal direction (E) set by the normal direction setting unit to calculate the coordinates of the contact position of the measurement surface and the tip.

In the present invention, it is also preferred that the scanning measurement instrument includes a deflection reference direction setting unit for setting, as a deflection reference direction ($P_b$), the direction of a vector obtained from the outer product of a vector ($E_b$) in a probe deflection direction obtained according to the deflection of the stylus detected by the deflection detection unit and the normal vector (H) of the scanning restraining section specified in advance. Furthermore, it is also preferred that the traveling direction setting unit switches the traveling direction (P) of the scanning probe according to amount of a change in a predetermined monitoring item between the path reference direction ($P_a$) set by the path reference direction setting unit and the deflection reference direction ($P_b$) set by the deflection reference direction setting unit.

In the present invention, it is also preferred that the traveling direction setting unit combines a vector ($P_a$) in the path reference direction set by the path reference direction setting unit and a vector ($P_b$) in the deflection reference direction set by the deflection reference direction setting unit at a ratio determined according to amount of a change in a predetermined monitoring item to set the traveling direction (P).

In the present invention, it is also preferred that the traveling direction setting unit monitors, as the monitoring item, at least one of the current deflection of the stylus detected by the deflection detection unit and the ratio of the current speed movement distance with respect to a specified speed movement distance of the scanning probe obtained according to the movement distance of the scanning probe detected by the movement distance detection unit.

An above-described Equation "at least one of" includes the current deflection of the stylus; the ratio of the current speed movement distance with respect to the specified speed movement distance; and the current deflection of the stylus and the ratio of the current speed movement distance with respect to the specified speed movement distance.

According to a scanning measurement instrument of the present invention, since the above-described components are provided, both higher accuracy and higher speed can be simultaneously achieved in autonomous scanning measurement.

According to a scanning measurement instrument of the present invention, since the data processor applies offset processing according to the radius of the tip to the coordinates of the center position of the tip in the normal direction (E) set by the normal direction setting unit, higher speed can be achieved in autonomous scanning measurement.

According to a scanning measurement instrument of the present invention, since the traveling direction setting unit switches the traveling direction (P) of the scanning probe to the deflection reference direction ($P_b$) according to amount of a change in a predetermined monitoring item, a higher level of both higher accuracy and higher speed can be simultaneously achieved in autonomous scanning measurement.

According to a scanning measurement instrument of the present invention, since the path reference direction vector ($P_a$) and the deflection reference direction vector ($P_b$) are combined at a predetermined ratio according to amount of a change in a predetermined monitoring item to set the traveling direction (P), a higher level of both higher accuracy and higher speed can be achieved in autonomous scanning measurement.

DESCRIPTION OF THE PREFERRED EMBODIMENT

A preferred embodiment of the present invention will be described below with reference to the drawings.

Figure 1:
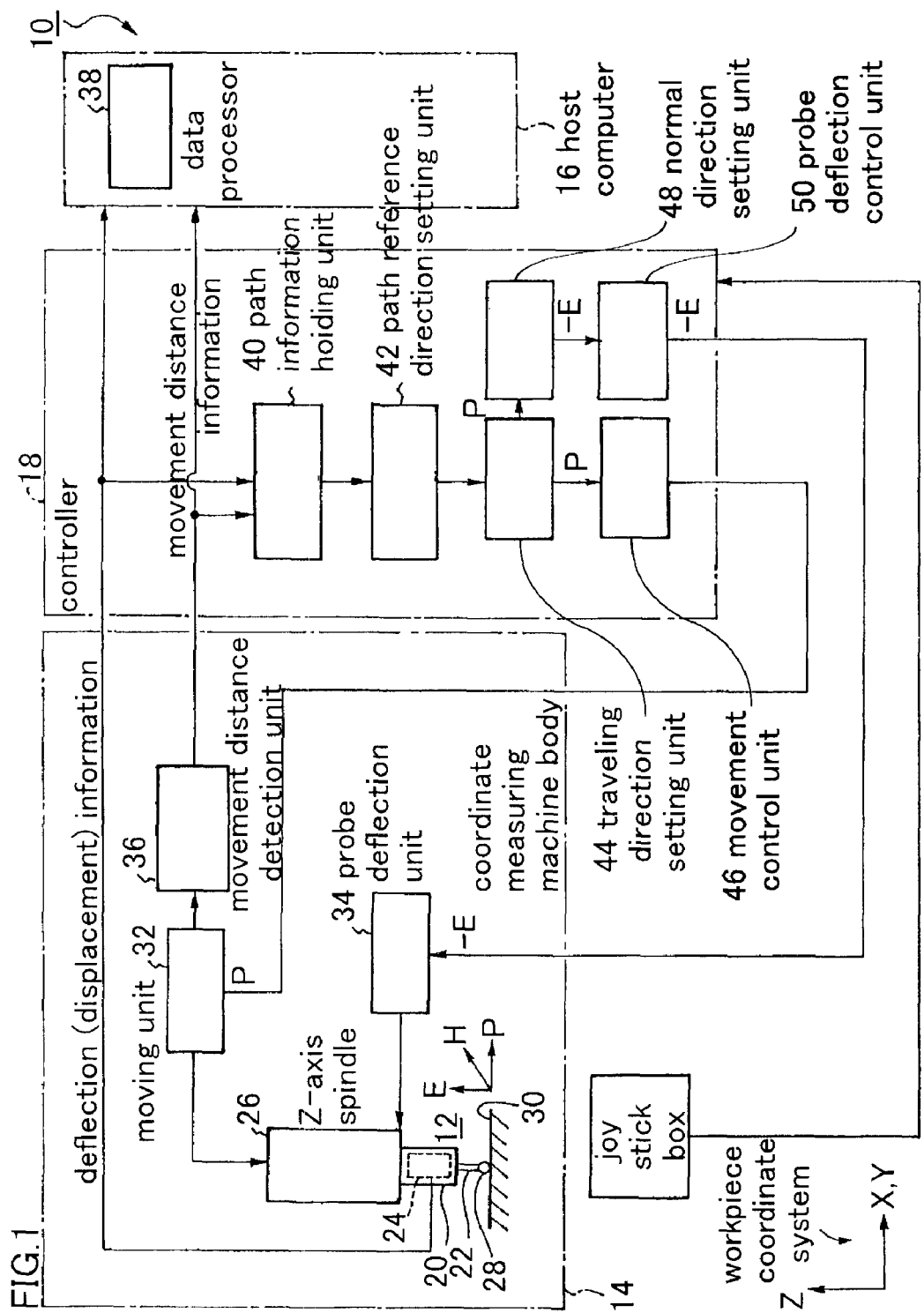
FIG. 1 is a view showing an outline structure of a scanning measurement instrument according to an embodiment of the present invention.

FIG. 1 shows an outlined structure of a scanning measurement instrument 10 according to an embodiment of the present invention.

As shown in the figure, the scanning measurement instrument 10 is formed of a computer numerical controlled (CNC) coordinate measuring machine and includes a scanning probe (a probe body, a stylus, a spherical tip, and a deflection detection unit) 12, a coordinate measuring machine body (a moving unit, a probe deflection unit, and a movement distance detection unit) 14 a host computer (a data processor) 16, and a controller (a path information holding unit, a path reference direction setting unit, a traveling direction setting unit, a movement control unit, a normal direction setting unit, and a probe deflection control unit) 18.

The scanning probe 12 is of a type using probe deflection distance constant control and includes a probe body 20, a stylus 22, a spherical tip 28 provided at an end of the stylus 22, and a deflection detection unit 24 for detecting the deflection (displacement) of the stylus 22 pushed into the probe body 20. The stylus 22 traces a measurement surface 30 of a workpiece while control is performed to keep the deflection of the stylus 22 pushed into the probe body 20 constant.

As the scanning probe 12, a probe of a type using measurement pressure constant control can also be used. Such a probe traces the measurement surface 30 while the tip 28 provided at the end of the stylus 22 contacts the measurement surface 30 of the workpiece, the measurement pressures applied by the stylus 22 along the X, Y, and Z axes are detected, for example, by piezoelectric devices, and control is performed such that a measurement pressure vector obtained by combining the vectors of these measurement pressures is kept constant. In the present invention, a scanning probe of either the type using probe deflection distance constant control or the type using measurement pressure constant control can be used.

In the following description, a scanning probe of the type using probe deflection distance constant control is mainly taken as an example.

The probe body 20 is provided at a lower end of a Z-axis spindle 26 of the coordinate measuring machine body 14 and is moved along the X, Y, and Z axes by the coordinate measuring machine body 14.

The stylus 22 is held such that the tip 28 contacts the measurement surface 30 and the stylus 22 can be deflected with respect to the probe body 20, in response to the concavity and convexity of the measurement surface 30.

The deflection detection unit 24 is built into the probe body 20 and detects the X deflection, the Y reflection, and the Z deflection of the center position of the tip 28 with respect to the probe body 20. These deflections are called probe output values in the present embodiment.

The coordinate measuring machine body 14 includes the Z-axis spindle 26, a moving unit 32, a probe deflection unit 34, and the movement distance detection unit 36. The Z-axis spindle 26 is a Z-axis spindle of the coordinate measuring machine body 14 and holds the scanning probe 12 at its lower end.

The moving unit 32 moves the Z-axis spindle 26 to move the scanning probe 12 along the measurement surface 30 such that the contact point between the measurement surface 30 and the scanning probe 12 moves.

The probe deflection unit 34 pushes the stylus 22 into the probe body 20 to press the scanning probe 12 against the measurement surface 30 with a predetermined measurement force.

The movement distance detection unit 36 detects the movement distance of the scanning probe 12 moved by the moving unit 32. This distance is called coordinates of the coordinate measuring machine in the present embodiment.

The host computer 16 includes a data processor 38.

The data processor 38 calculates the coordinates of the center position of the tip 28 of the scanning probe 12 according to the probe output values obtained by the deflection detection unit 24 and the coordinates of the coordinate measuring machine obtained by the movement distance detection unit 36.

The data processor 38 also calculates the coordinates of the contact point between the measurement surface 30 and the tip 28 according to the coordinates of the center position of the tip 28. The data processor 38 also obtains the shape or dimensions of the measurement surface 30 according to the coordinates of contact points between the measurement surface 30 and the tip 28.

In the present embodiment, to control the traveling direction (P) of the scanning probe 12, the controller 18 includes a path information holding unit 40, a path reference direction setting unit 42, a traveling direction setting unit 44, and a movement control unit 46.

The pith information holding unit 40 holds path information about the path of the center position of the tip 28 of the scanning probe 12 from the current center position to the previous center positions in steps of a predetermined measurement pitch (path information about the path of the center positions of the tip 28 slightly past the current center position in steps of a very short distance (length)) in the direction opposite to the movement direction of the scanning probe 12 during autonomous scanning measurement performed with the scanning probe 12. In the present embodiment, this path information is called a tip center position path.

The path reference direction setting unit 42 calculates an approximate straight line direction (the direction of an extension line of tip center positions slightly past the current tip center position in steps of a very short distance) from the tip center position path stored in the path information holding unit 40, as a path reference direction (the direction of a path reference direction vector $P_a$).

The traveling direction setting unit 44 determines the path reference direction ($P_a$) calculated by the path reference direction setting unit 42, as the traveling direction of the scanning probe 12 (the direction of a scanning traveling direction vector P).

The movement control unit 46 controls the movement of the scanning probe 12 moved by the moving unit 32 so that the scanning probe 12 moves along the traveling direction (P) determined by the traveling direction setting unit 44.

In the present embodiment, to control the probe deflection of the scanning probe 12 toward the measurement surface 30, the controller 18 also includes a normal direction setting unit 48 and a probe deflection control unit 50.

The normal direction setting unit 48 obtains the normal direction (E) of the measurement surface 30 according to the direction of a vector calculated from the outer product of the scanning traveling direction vector P determined in the traveling direction setting unit 44 and a normal vector H of a scanning restraining section 70 specified in advance.

The probe deflection control section 50 controls probe deflection applied to the scanning probe 12 by the probe deflection unit 34 such that the deflection direction ($E_b$) of the stylus 22 with respect to the probe body 20 (the probe deflection direction of the stylus 22 with respect to the probe body 20) matches the normal direction (E) obtained by the normal direction setting unit 48 and the probe output value obtained by the deflection detection unit 24 in the normal direction (the current deflection of the stylus 22 with respect to the probe body 20) matches a predetermined reference deflection.

In the present embodiment, the data processor 38 applies offset processing to the coordinates of the center position of the tip 28 according to the radius (tip size) of the tip 28 in the normal direction (E) obtained by the normal direction setting unit 48 to calculate the coordinates of the contact point of the measurement surface 30 and the tip 28.

The scanning measurement instrument 10 of the present embodiment is configured in outline as described above. Its operation will be described below.

When the host computer 16 sends a scanning measurement command to the controller 18, the controller 18 starts scanning measurement according to the command and sends back to the host computer 16 coordinates of the coordinate measuring machine and probe output values at intervals equal to the instructed measurement pitch.

More Specifically, the coordinates of the center position of the tip 28 of the scanning probe 12 are measured at a predetermined pitch by moving the scanning probe 12 along a measurement surface 30 specified in advance while the scanning probe 12 is made to contact the measurement surface 30 with a predetermined measurement force. In this measurement, the traveling direction (P) of the scanning probe 12 is determined and the scanning probe 12 is moved in the determined traveling direction (P) to perform autonomous scanning measurement.

When an instructed scanning end condition is satisfied, the scanning measurement operation is stopped, the scanning probe 12 is separated from the workpiece in the deflection direction ($E_b$), and the scanning measurement ends.

The coordinates of a point on the measurement surface 30 can be calculated according to the coordinates of the center position of the tip 28, obtained as described above. The shape or dimensions of the measurement surface 30 can be determined according to the coordinates of points on the measurement surface 30.

In the present embodiment, the traveling direction (P) of the scanning probe 12 is determined by a probe path reference method, and the probe deflection direction (–E) of the scanning probe 12 is determined according to the traveling direction (P) to perform scanning control, allowing autonomous scanning measurement to be performed at high speed with high accuracy.

Figure 2A:
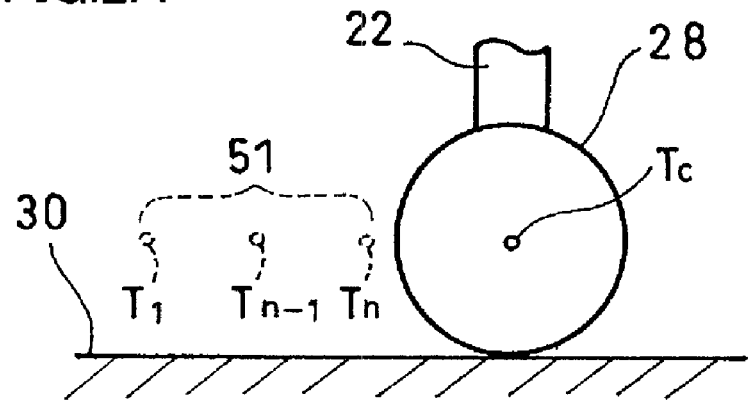
FIG. 2. to FIG. 2F show how a path reference direction is calculated by a probe path reference method, which is a feature of the scanning measurement instrument shown in FIG. 1.

More specifically, in the present embodiment, a path 51 of center positions $T_n$ to $T_1$ of the tip 28 slightly past the current center position $T_c$ in steps of a predetermined minute distance is held, as shown in FIG. 2A.

Figure 2B:
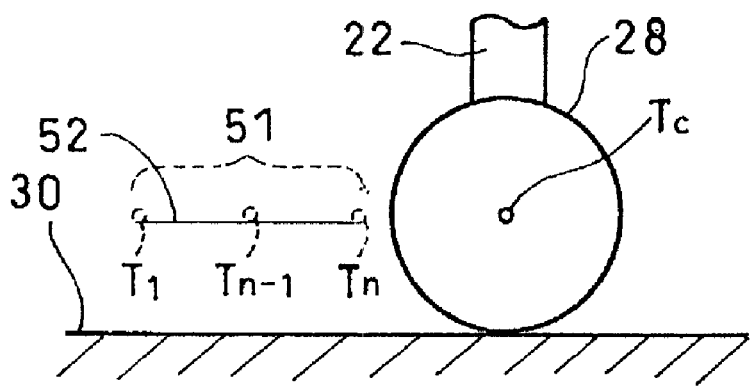

Then, an approximate straight line 52 of the path 51 of the tip center positions $T_n$ to $T_1$ is calculated, as shown in FIG. 2B.

Figure 2C:
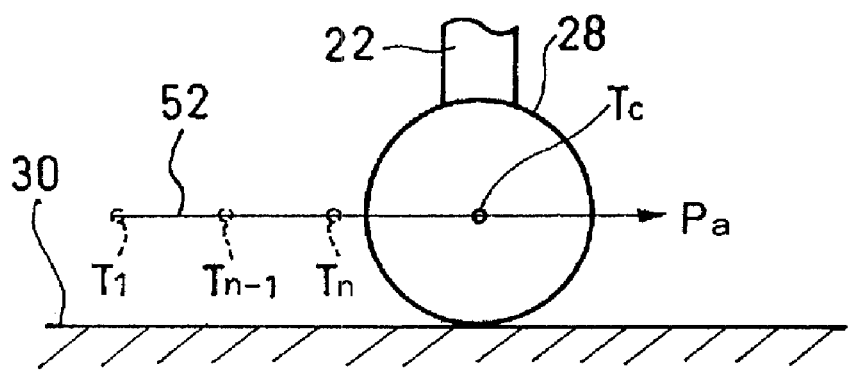
Figure 2D:
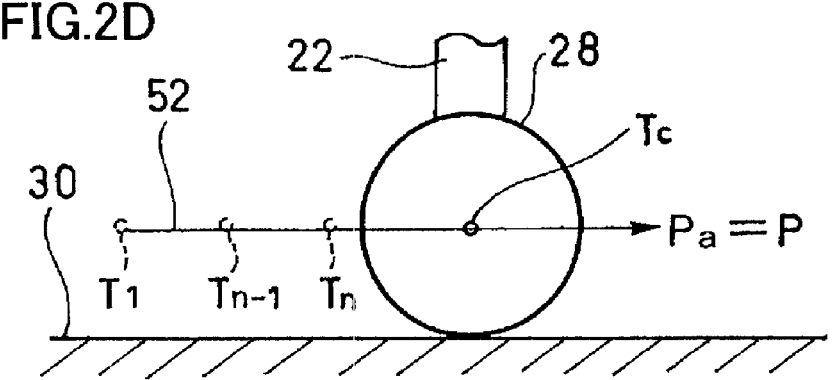

The direction of an extension line of the approximate straight line 52 is set as the path reference direction ($P_a$), as shown in FIG. 2C. Since that direction ($P_a$) is set as the traveling direction (P) of the scanning probe 12 at the current position, as shown in FIG. 2D, the traveling direction (P) of the scanning probe 12 can be accurately determined at the present position.

Figure 2E:
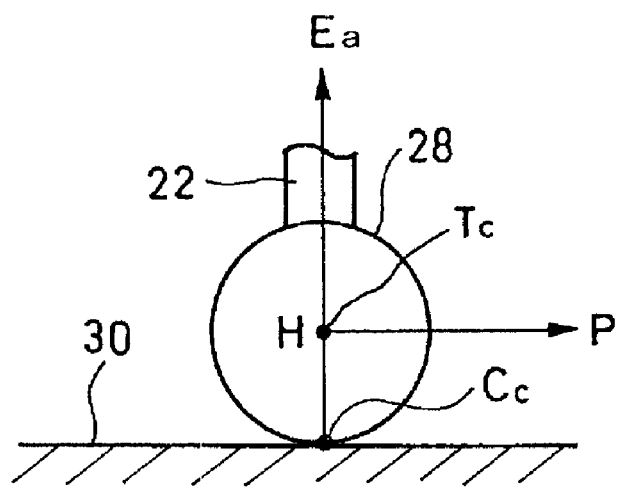

The direction of a vector (deflection direction vector $E_a$) calculated from the outer product of the traveling direction vector P at the current position and the normal vector H of the scanning restraining section 70 specified in advance is set as the deflection direction ($E_a$) of the scanning probe 12, as shown in FIG. 2E. This direction ($E_a$) is the normal direction of the measurement surface 30, that is, the direction of a vector from the current contact point $C_c$ between the measurement surface 30 and the tip 28 to the current tip center position $T_c$.

Figure 2F:
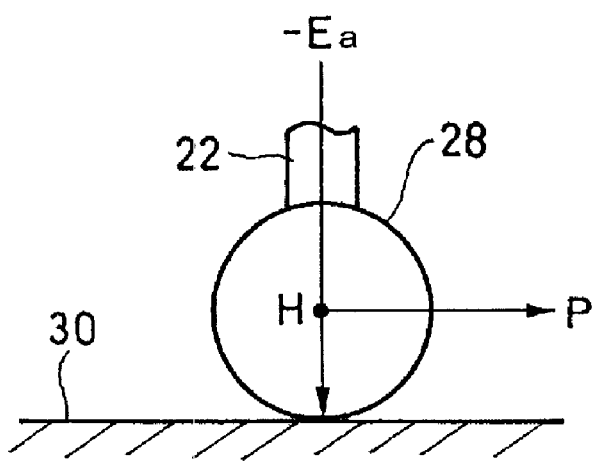

The direction ($–E_a$ in the figure) opposite the direction of the deflection direction vector $E_a$ at the current position can be set as the probe deflection direction (–E) of the stylus 22 with respect to the probe body 20, as shown in FIG. 2F.

The probe deflection direction (–E) of the scanning probe 12 with respect to the current measurement surface 30 can be accurately determined according to the traveling direction (P) accurately obtained at the current position.

The movement control unit 46 controls the movement of the scanning probe 12 moved by the moving unit 32 such that the scanning probe 12 moves in the direction (hereinafter called a final traveling direction) of the scanning traveling direction vector P obtained by the traveling direction setting unit 44, and the probe deflection control unit 50 controls the probe deflection applied to the scanning probe 12 performed by the probe deflection unit 34 such that the probe deflection direction (the deflection direction $E_b$) of the scanning probe 12 with respect to the measurement surface 30 matches the normal direction (E) obtained by t e normal direction setting unit 48 and such that the stylus deflection obtained by the deflection detection unit 24 in the normal direction (E) matches the predetermined deflection, allowing both higher accuracy and higher speed to be implemented in autonomous scanning measurement.

The present embodiment is especially effective even if the scanning probe 12 has a small permissible range of probe deflection because out-of-the-permissible-range errors can be reduced.

In addition, the zigzag movement of the scanning probe 12 can be much reduced.

Much Higher Accuracy and Higher Speed

To implement much higher accuracy and higher speed in autonomous scanning measurements, it is also preferred in the present embodiment that the following offset processing be used.

Conventionally, because it was not known which position of the spherical tip touched the workpiece, a free surface was set in the computer according to a plurality of sets of scanning measurement data, and offset processing was applied to this free surface according to the size of the tip to calculate the sectional shape at any position on the measurement surface and the distance from the designed value to obtain information about dimensional errors. Therefore, it took much labor and time conventionally to perform multiple-section measurements, the free-surface fitting process conducted in the computer, a process for calculating actual-surface values at any section, and other processes until the surface coordinates (actual-surface values) of the workpiece calculated with an offset of the radius of the spherical tip were obtained.

In contrast, because the normal direction (E) of the measurement surface 30 can be accurately obtained during scanning measurement in the present embodiment, the offset processing according to the radius of the tip can be applied to each measurement data in real time.

Figure 3:
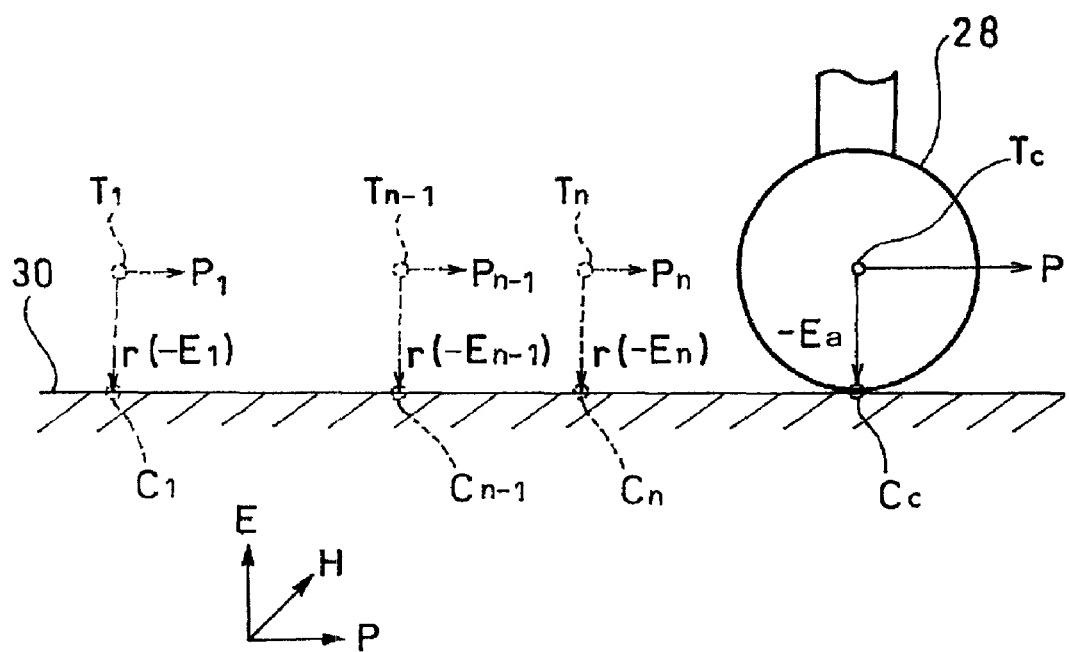
FIG. 3 shows preferred offset processing in the scanning measurement instrument shown in FIG. 1

In the present embodiment, the data processor 38 applies the offset processing to the coordinates of each center position $T_n$ of the tip 28 according to the radius r of the tip 28 in the normal direction ($-E_n$) obtained by the normal direction setting unit 28 at each center position $T_n$ to calculate the coordinates of the contact point $C_n$ between the measurement surface 30 and the tip 28, as shown in FIG. 3.

As a result, since the offset processing according to the radius of the tip can be applied to measurement data while scanning measurement is being performed, autonomous scanning measurement is performed at higher speed.

To implement much higher accuracy and higher speed in autonomous scanning measurements, it is also preferred in the present embodiment that the following algorithm be used when the traveling direction (P) is set.

Figure 4A:
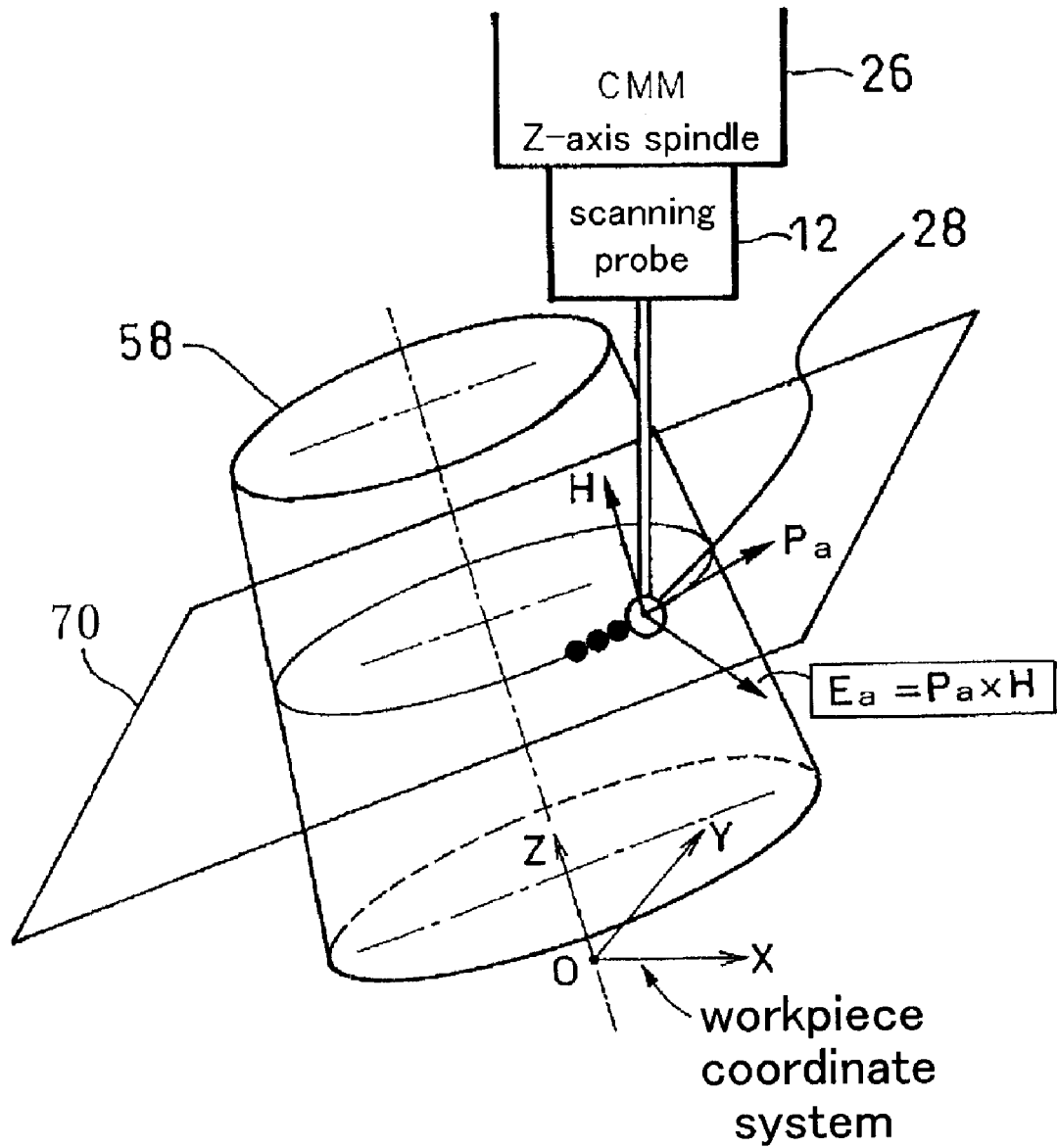
FIG. 4 and FIG. 4B show a preferred way of using the probe path reference method and a probe deflection reference method in parallel in the scanning measurement instrument shown in FIG. 1.

The traveling direction (P) of the scanning probe 12 is determined by the probe path reference method shown in FIG. 4A and the following Table 1 in the present embodiment. At the start of scanning measurement or at a position where the measurement surface 30 has a large curvature, the movement of the scanning probe 12 may be stopped temporarily. If the movement of the canning probe 12 is stopped, since path information required to set the traveling direction (P) is not obtained, it may not be possible to determine the traveling direction (P).

Figure 4B:
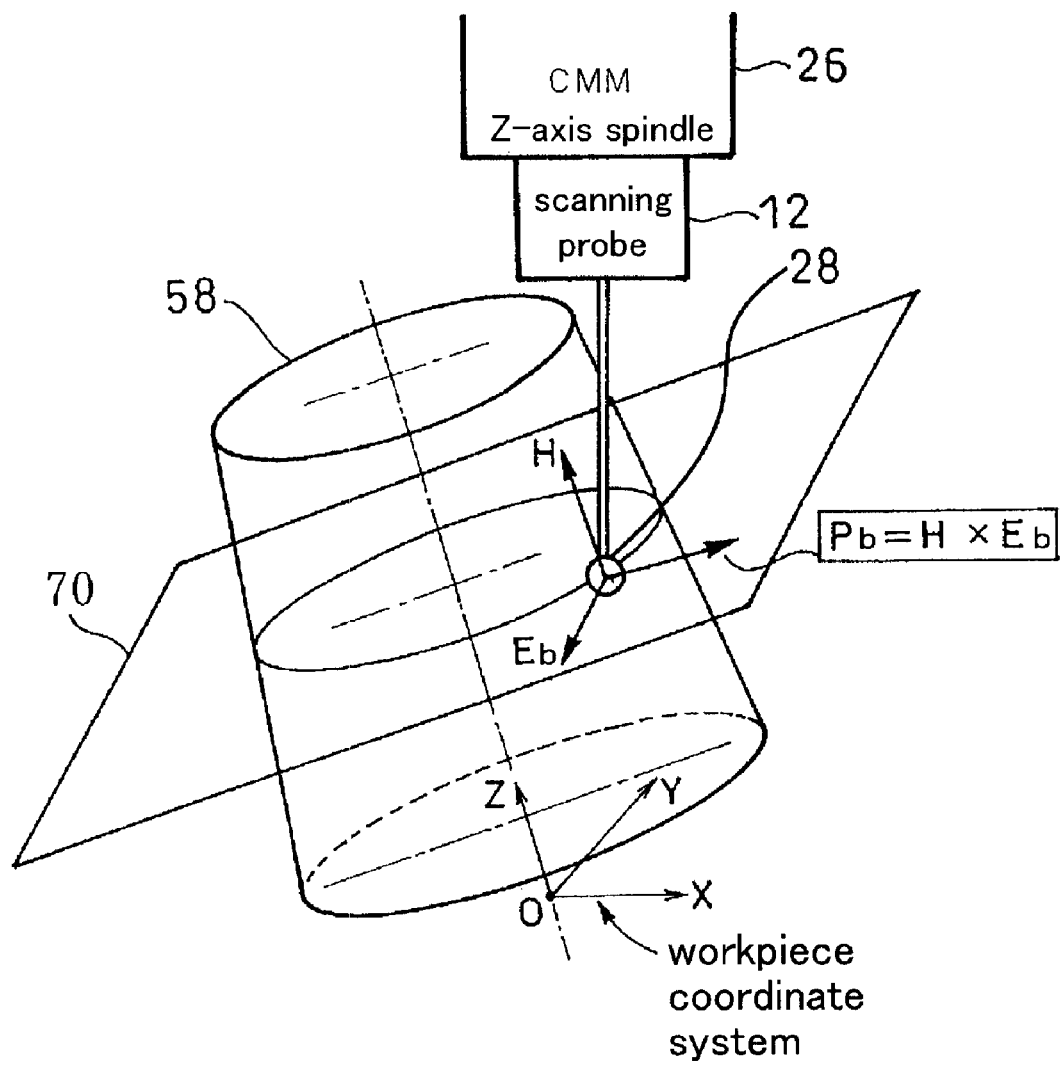

To perform scanning control even at a position where the measurement surface 30 has a large curvature, without stopping the movement of the scanning probe 12, it is preferred in the present embodiment that the probe path reference method and a probe deflection reference method shown in FIG. 4B and the following Table 2 be used together as the algorithms for calculating the traveling direction (P).

TABLE 1

Probe path reference method

| Control direction vector | Code | Way to derive | Attention | Accuracy |
|---|---|---|---|---|
| Normal vector of scanning restraining section | H | Specified by Command | | |
| Vector in probe deflection direction | $E_a$ | $E_a = P_a \times H$ | ≈Normal line | ○ |
| Vector in path reference direction | $P_a$ | Line of tangency against probe path | Approximate straight line | ○ |

TABLE 2

Probe deflection reference method

| Control direction vector | Code | Way to derive | Attention | Accuracy |
|---|---|---|---|---|
| Normal vector of scanning restraining section | H | Specified by Command | | |
| Vector in probe deflection direction | $E_b$ | Probe output | ≠Normal line | Δ |
| Vector in deflection reference direction | $P_b$ | $P_b = H \times E_b$ | Large error margin | Δ |

When the probe path reference method shown in FIG. 4A and the foregoing Table 1 and the probe deflection reference method shown in FIG. 4B and the foregoing Table 2 are used together, it is preferred, for example, to switch between both methods, and it is especially preferred that both methods be combined.

A scanning restraining section 70 specified in advance for a workpiece 58 is an XY plane (plane defined by the X axis and the Y axis perpendicular to the Z axis in a workpiece coordinate system) having a predetermined coordinate in the direction (matching the Z-axis direction in the workpiece coordinate system) of the normal vector H of the section 70 as shown in FIG. 4A and FIG. 4B. The scanning probe 12 is driven and controlled such that the tip center position $T_c$ is always on the scanning restraining section 70 (the Z coordinate of the workpiece coordinate system always approaches the target value as close as possible).

Figure 5:
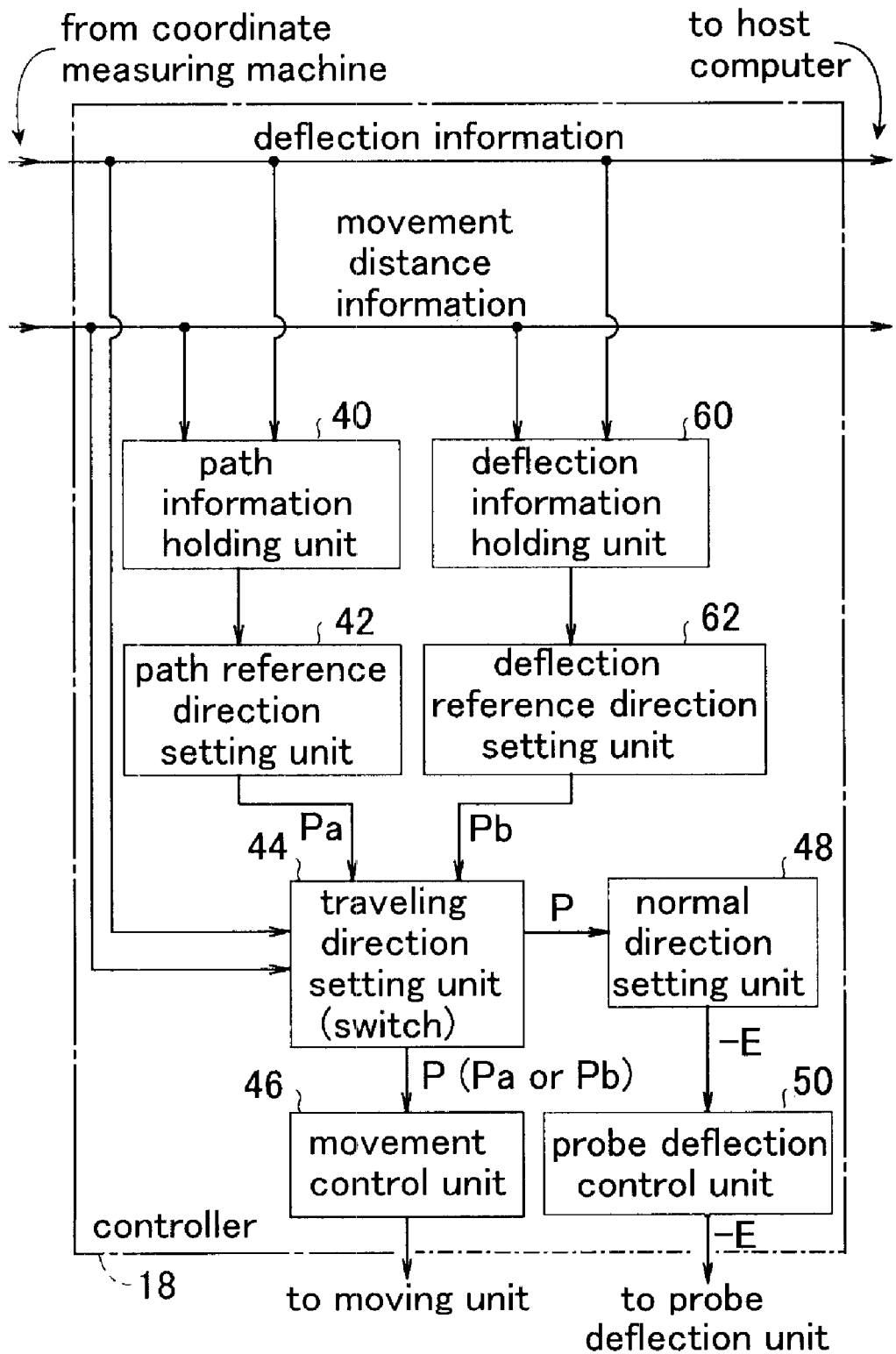
FIG. 5 is a view showing a preferred way of switching the probe path reference method and the probe deflection reference method in the scanning measurement instrument shown in FIG. 1.

(1) Switching Between the Probe Path Reference Method and the Probe Deflection Reference Method To switch between the probe path reference method and the probe deflection reference method, it is preferred, as shown in FIG. 5, that the controller 18 include a deflection information holding unit 60 and a deflection reference direction setting unit 62.

The deflection information holding unit 60 holds information about the deflection direction vector E, of the scanning probe 12, obtained according to the probe output values.

The deflection reference direction setting unit 62 calculates a deflection reference direction vector $P_b$ from the outer product of the deflection direction vector $E_b$ obtained according to the probe output values and the normal vector H of the scanning restraining section 70 specified in advance, and sets the direction of the deflection reference direction vector $P_b$ as a deflection reference direction.

The traveling direction setting unit 44 switches the traveling direction (P), according to amount of a change in a predetermined monitoring item, to the path reference direction ($P_a$) obtained by the path reference direction setting unit 42 or to the deflection reference direction ($P_b$) obtained by the deflection reference direction setting unit 62.

In the present embodiment, to obtain amount of a change in the predetermined monitoring item, the traveling direction setting unit 44 monitors the current deflection of the stylus 22 with respect to the probe body 20, obtained by the deflection detection unit 24, and the ratio S of the current speed movement distance L to a specified speed movement distance $L_0$ of the scanning probe 12. The ratio S of the current speed movement distance L to a specified speed movement distance of the scanning probe 12 is calculated according to the movement distance of the scanning probe 12 made by the moving unit 32, obtained by the movement distance detection unit 36.

As amount of a change in the predetermined monitoring item, the traveling direction setting unit 44 uses amount of a change in the current deflection of the stylus 22 with respect to the probe body 20 or amount of a change in the ratio S of the current speed movement distance L to the specified speed movement distance $L_0$ of the scanning probe 12, whichever is smaller.

When the traveling direction setting unit 44 determines that the change in the predetermined monitoring item is smaller than a threshold value, the traveling direction setting unit 44 sets the path reference direction ($P_a$) by the probe path reference method as the traveling direction (P).

As a result, scanning control can be performed at high speed with high accuracy by using the path reference direction ($P_a$) determined by the probe path reference method at positions where amount of the change in the predetermined monitoring item is small, that is, at positions having small curvature changes on the measurement surface 30.

In contrast, when the traveling direction setting unit 44 determines that amount of the change in the predetermined monitoring item is larger than the threshold value, the traveling direction setting unit 44 determines the deflection reference direction ($P_b$) by the probe deflection reference method as the traveling direction (P).

As a result, scanning control can be performed even at positions where amount of the change in the predetermined monitoring item is large, that is, at positions having large curvature changes on the measurement surface 30, without stopping the scanning measurement because the deflection reference direction ($P_b$) determined by the probe deflection reference method can be obtained as scanning control information.

Even if the path information is not updated because the tip 28 enters a hole or it scans a surface having an acute angle, since the algorithm for calculating the traveling direction is switched to the probe deflection reference method, scanning measurement that is unsusceptible to limitations caused by the scanning probe characteristics, such as a permissible deflection range and the directivity, can be implemented. Therefore, a higher level of both higher accuracy and higher speed in autonomous scanning measurements can be achieved.

Figure 6:
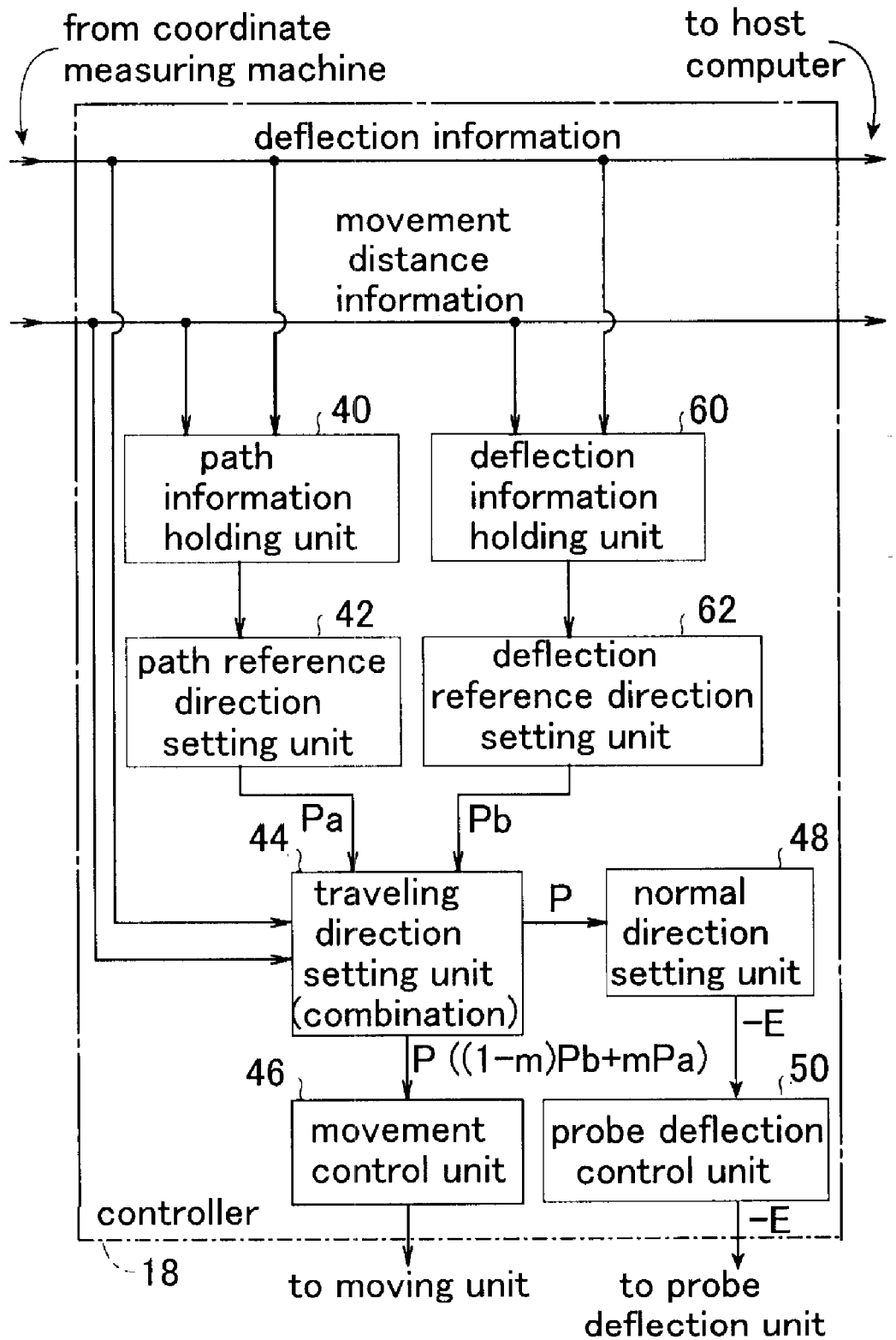
FIG. 6 is a view showing a way of combining the probe path reference method and the probe deflection reference method in the scanning measurement instrument shown in FIG. 1, which is more preferred than the preferred way of switching the methods.

(2) Combining the Probe Path Reference Method and the Probe Deflection Reference Method To combine the probe path reference method and the probe deflection reference method, it is more preferred, as shown in FIG. 6, that the controller 18 include a deflection information holding unit 60 and a deflection reference direction setting unit 62.

The traveling direction setting unit 44 combines the path reference direction vector $P_a$ obtained by the path reference direction setting unit 42 and the deflection reference direction vector $P_b$ obtained by the deflection reference direction setting unit 62 at a ratio, m:(1−m), determined according to amount of a change in a predetermined monitoring item to calculate the final scanning traveling direction vector P=(1−m)$P_b$+m$P_a$. The direction of the final scanning traveling direction vector P is set as the traveling direction.

More specifically, as the numerical value of the predetermined monitoring item becomes smaller, the traveling direction setting unit 44 calculates the final scanning traveling direction vector P such that the coefficient, m, of the path reference direction vector $P_a$ becomes gradually larger than the coefficient, 1−m, of the deflection reference direction vector $P_b$.

As a result, scanning control can be performed at high speed with high accuracy because the path reference direction vector $P_a$ has a large influence on the final scanning traveling direction vector P on a measurement surface having small curvature.

In contrast, as the numerical value of the predetermined monitoring item becomes larger, the traveling direction setting unit 44 calculates the final scanning traveling direction vector P such that the coefficient, m, of the path reference direction vector $P_a$ becomes gradually smaller than the coefficient, 1−m, of the deflection reference direction vector $P_b$.

As a result, because the deflection reference direction vector $P_b$ of the probe deflection reference method has a large influence on the final scanning traveling direction vector P on a measurement surface having large curvature, scanning control information can be reliably obtained. Therefore, scanning control can be performed without stopping scanning measurement.

With the combination of the probe path reference method and the probe deflection reference method, higher speed and higher accuracy can be more reliably achieved in autonomous scanning measurements.

In addition, a scanning measurement function unsusceptible to limitations caused by the scanning probe characteristics can be achieved.

The method for combining the probe path reference method and the probe deflection reference method will be described below in more detail.

Outline of Scanning Measurement Control Processing

Figure 7:
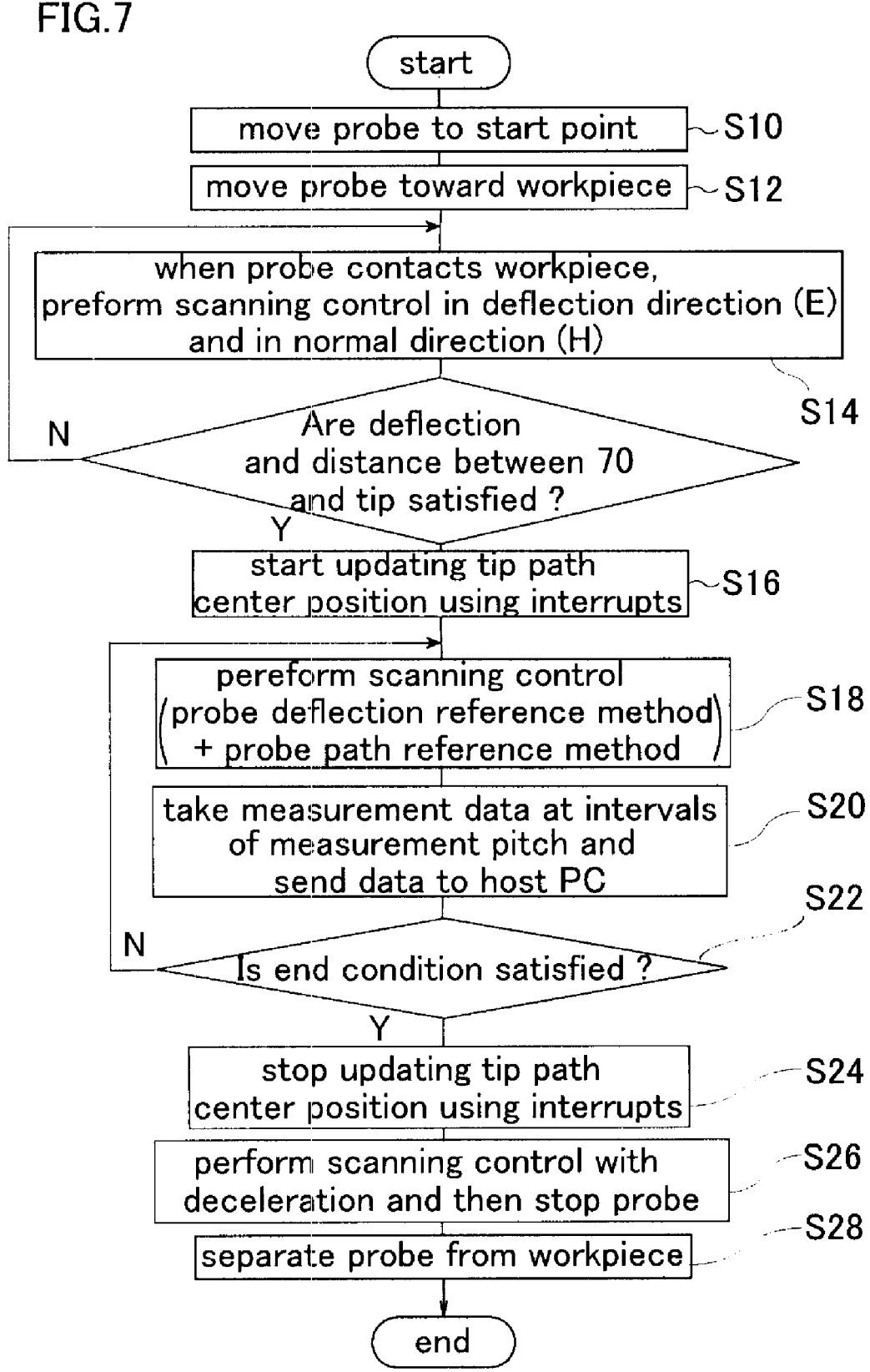
FIG. 7 is a flowchart showing an outline of scanning measurement control performed by a controller shown in FIG. 6.

An outline of scanning measurement control processing with the combination of the probe path reference method and the probe deflection reference method will be described first with reference to FIG. 7.

(1) The scanning probe is moved from the current point to the starting point (without contacting the workpiece) of a scanning measurement operation (S10).

(2) The scanning probe is moved toward the workpiece (S12).

(3) After the scanning probe contacts the workpiece, scanning control is performed such that the magnitude of the probe deflection in the direction E is within a predetermined range and the distance between a scanning restraining section 70 specified in advance and the tip center position is as small as possible and is equal to or smaller than a predetermined value (S14). The scan sing restraining section 70 is the target control section for the tip center position.

(4) After the process (3) above, updating of the tip path center (at 2N points or more) using interrupts is started (S16).

(5) Scanning control is performed with the combination of the probe path reference method and the probe deflection reference method (S18).

(6) Measurement data is taken at intervals of the measurement pitch and sent to the host computer (S20).

(7) It is determined whether an end condition is satisfied (S22).

(8) When the end condition is satisfied, updating of the tip path center using interrupts is stopped (S24).

(9) Scanning control with deceleration is performed and then the scanning probe is stopped (S26). The probe deflection reference method is used for scanning control with deceleration.

(10) The scanning probe is separated from the workpiece (S28).

Combination Control Procedure

The combination control procedure (S18) will be described next more specifically with reference to FIG. 8.

Figure 8:
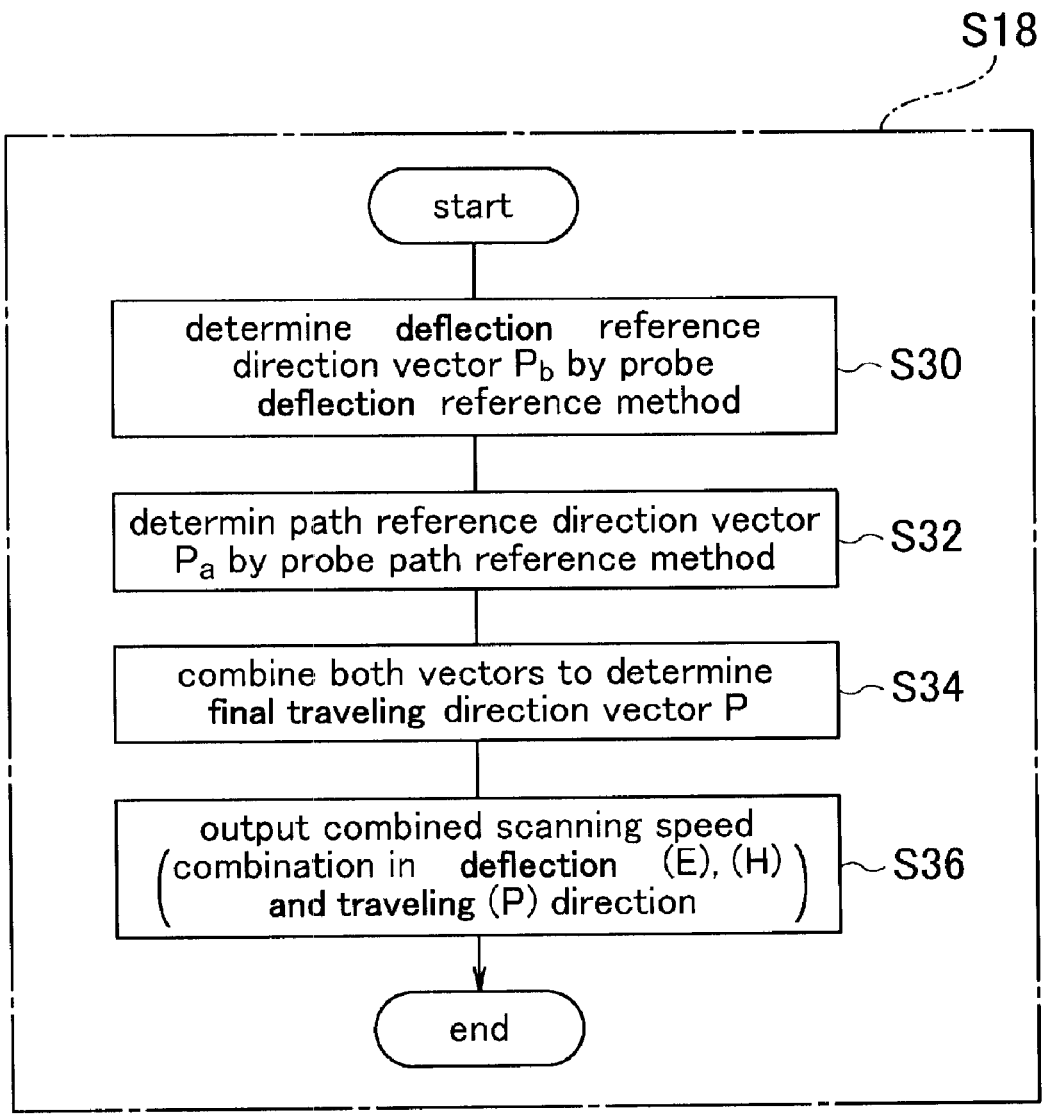
FIG. 8 is a flowchart of a control procedure performed by the controller shown in FIG. 6 for combining the probe path reference method and the probe deflection reference method.

The combination control procedure (S18) is shown below as illustrated in FIG. 8.

(1) The deflection reference direction ($P_b$) is determined by the probe deflection reference method (S30).

(2) The path reference direction ($P_a$) is determined by the probe path reference method (S32).

(3) The deflection reference direction ($P_b$) and the path reference direction ($P_a$) are combined to determine the final traveling direction vector P (S34).

(4) The probe deflection direction (E) is set to the direction of a vector obtained from the outer product of the final scanning traveling direction vector P and the normal vector H of the scanning restraining section. The actual scanning speed is set to a speed obtained by combining the scanning speed in the final scanning traveling direction (P), the speed in the direction of the normal vector (H) of the scanning restraining section, and the speed in the probe deflection direction (E) perpendicular to the final scanning traveling direction (P) and perpendicular to the normal vector (H) (S36).

Determining Deflection Reference Direction ($P_b$)

The step (S30) for determining the deflection reference direction ($P_b$) will be described next in more detail.

The probe deflection reference method assumes that the probe deflection direction ($E_b$) matches the normal direction of the measurement surface. The deflection reference direction ($P_b$) is determined to be the direction of a vector obtained from the outer product of the normal vector H of the specified scanning restraining section and the deflection direction vector $E_b$ of the probe. $P_b$ (unit vector) is determined by the following Equations.

$P_b = E \times E_b$ (H: normal vector of the scanning restraining section, $E_b$: deflection direction vector)

$P_b$(unit vector)=$P_b/|P_b|$

Determining Path Reference Direction ($P_a$)

The step (S32) for determining the path reference direction ($P_a$) will be described next in more detail with reference to FIG. 9 and FIG. 10.

The probe path reference method uses the tangential direction of the probe path as the traveling direction (P) in order to avoid the problem of the probe deflection direction ($E_b$) not matching the normal direction of the measurement surface due to the influence of friction.

Figure 9:
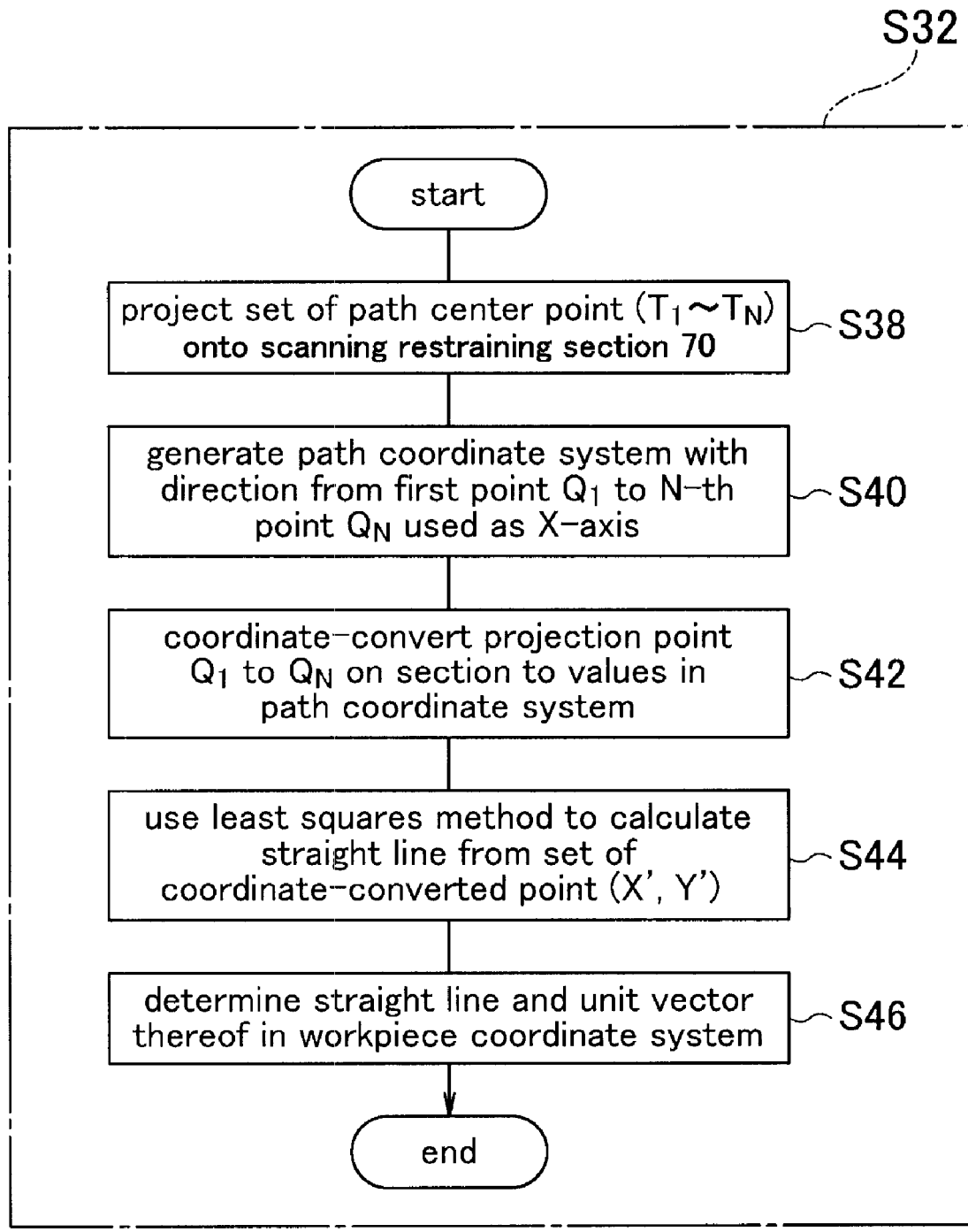
FIG. 9 is a flowchart of a procedure performed by the controller shown in FIG. 6 for determining a traveling direction vector by the probe path reference method.

An outline of the step (S32) for determining the path reference direction $P_a$ is shown below, as illustrated in FIG. 9.
(1) A group of points ($T_1$ to $T_N$) indicating the tip center positions are projected onto the scanning restraining section 70 (S38).
(2) A path coordinate system (X'-Y'-Z') is generated with the direction (X") from a first projection point ($Q_1$) to a N-th projection point ($Q_N$) used as the X axis (S40).
(3) The projection points on the scanning restraining section 70 are coordinate-converted to values in a path coordinate system (S42).
(4) A set of coordinate-converted points are used to determine an approximate straight line by the least squares method (S44).
(5) An approximate straight line and the unit vector thereof are determined in a workpiece coordinate system (S46).

The above-described steps (S38 to S46) will be explained below in more detail.

(1) The Group of Points ($T_1$ to $T_N$) Indicating the Tip Center Positions are Projected onto the Scanning Restraining Section 70 (S38).

To project the group of points indicating the path center positions to positions located on both the scanning restraining section 70 and the measurement surface 30 (S38), the following tip center position path is obtained.

As position information during scanning, the path (coordinates) of N past tip center positions is stored.

The following Table 3 shows the relationship between the sample pitch M and the path length LM.

TABLE 3

| | sampling time | number of tip position | path length(each sampling time) | | sample pitch | path length | scanning speed |
|---|---|---|---|---|---|---|---|
| | T (sec) | N (positions) | L(V15) = 15T * N (mm) | L(V1) = T * N (mm) | M (mm) | LM = N * M (mm) | $V_M$ = M/T (mm/sec) |
| Parameter set to controller | 0.002 | 20 | 0.6 | 0.04 | 0.01 | 0.2 | 5 |

For example, when the scanning speed $V_M$ is 5 mm/s, the sample pitch M is set to the movement distance per sampling time T each position.

The number of tip center positions to be actually stored is 2N or more, and the latest N positions are used.

The coordinates to be stored may be XYZ three-dimensional coordinates. Alternatively, they may be two-dimensional coordinates obtained when the positions are projected onto the scanning restraining section 70 in the workpiece coordinate system in order to save memory and not to reduce the calculation speed.

When the movement distance per sampling time T is shorter than the sample pitch M, if the movement distance of the scanning probe exceeds the sample pitch M, a tip center position is stored.

Even at a low speed (lower than 5 mm/s), a path length LM of 0.2 mm is always obtained.

Because the path length LM is the sum of sample-pitch lengths, the minimum path length can always be obtained. The length is not the shortest distance between the first position and the last position but the sum of sample-pitch lengths connected like a zigzag line.

When the movement distance per sampling time T is equal to or longer than the sample pitch M, a tip center position is stored at each sampling time T.

Because the curvature is usually small at a high speed (5 mm/s or higher), the path length LM is extended to improve the calculation accuracy in the tangential direction of the straight line obtained from the path.

Figure 10:
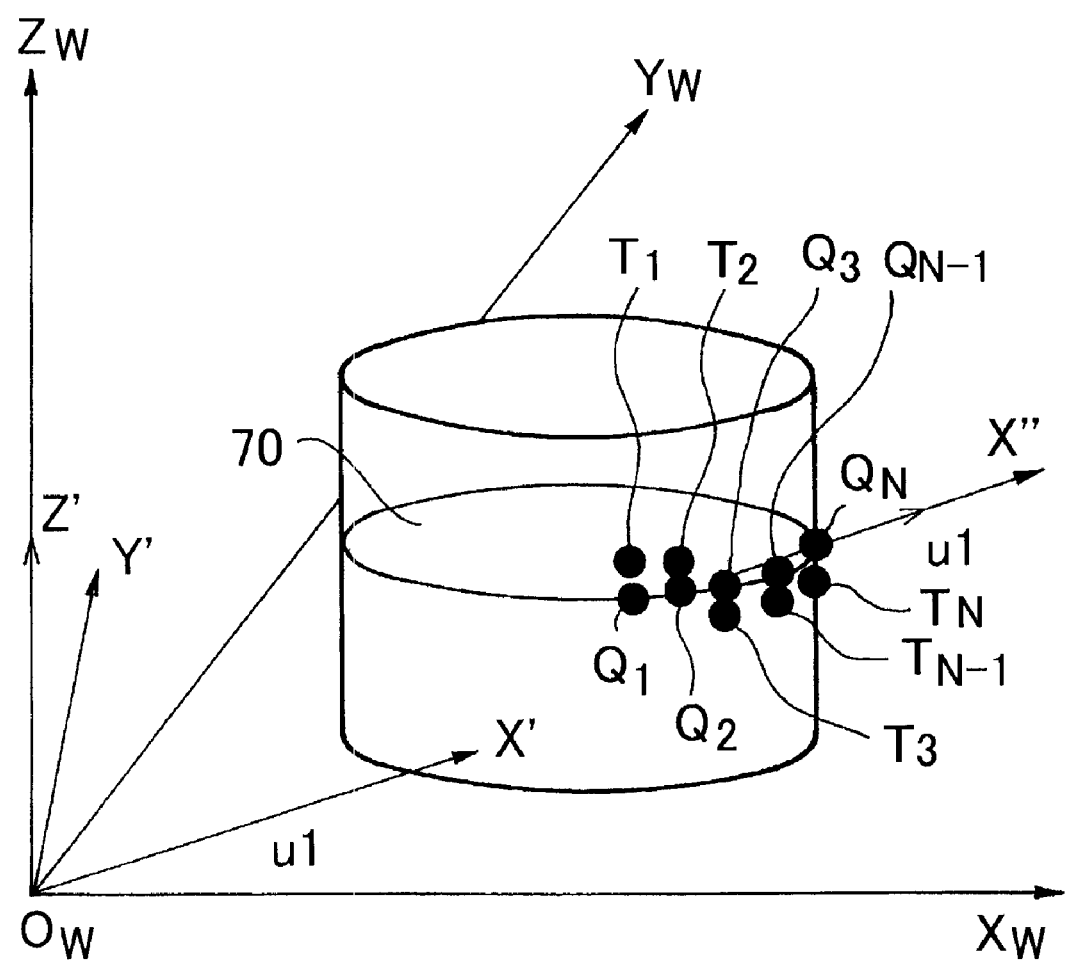
FIG. 10 is a view showing a path information acquisition method performed by the controller shown in FIG. 6.

As shown in FIG. 10, the above-described set of points ($T_1$ to $T_N$ in the workpiece coordinate system) are projected onto the scanning restraining section 70.

In the figure, only five points are shown for convenience, but N points shown in Table 3 are actually used.

The points ($T_1$ to $T_N$) are projected onto the scanning restraining section 70 to obtain projection points ($Q_1$ to $Q_N$).

The scanning restraining section 70 is parallel to the XY plane of the workpiece coordinate system (Xw-Yw-Zw). Therefore, projection onto the scanning restraining section 70 is regarded as being equivalent to that onto the XY plane.

(2) Generating Path Coordinate System (S40)

In the step (S40) for generating a path coordinate system, a temporary workpiece coordinate system (X'-Y'-Z', hereinafter called a path coordinate system) having an X' axis parallel to the direction X" from the first projection point ($Q_1$) to the N-th projection point ($Q_N$) is generated.

The first projection point here corresponds to the oldest sample among the N samples.

Then, to avoid a case in which the equation of the straight line described later is X'=constant, a path coordinate system is generated.

The unit vector $u_1$ of the vector from the projection point $Q_1$ to the N-th projection point $Q_N$ in the workpiece coordinate system can be obtained by the following equation.

$u_1$(unit vector)=$(Q_N-Q_1)/|Q_N-Q_1|=(u_x, u_y)$

Therefore, the coordinate conversion matrix for conversion from the workpiece coordinate system to the path coordinate system is shown by the following Equation 1.

$$\begin{pmatrix} x' \\ y' \end{pmatrix} = \begin{pmatrix} u_x & u_y \\ -u_y & u_x \end{pmatrix} \begin{pmatrix} x_w \\ y_w \end{pmatrix}$$ (Equation 1)

(3) Conversion to Path Coordinate System (S42)

In the step (S42) for converting to the path coordinate system, the set of projection points on the scanning restraining section 70 are coordinate-converted to values in the path coordinate system.

More specifically, in this step (S42), Equation 1 shown above is used to coordinate-convert the set of projection points on the scanning restraining section 70 to values in the path coordinate system.

(4) Determining Straight Line (S44)

In the step (S44) for determining a straight line, the least squares method is used to determine the straight line from the set of coordinate-converted points.

More specifically, the least squares method is used to determine the straight line $y'=a_t x'+b_t$ from the set of points obtained by the above-described conversion to the path coordinate system. The following Equation 2 is used to calculate $a_t$ and $b_t$.

$$B = \sum_{i=1}^{N} x_i * x_i, \ C = \sum_{i=1}^{N} y_i, \ D = \sum_{i=1}^{N} x_i * y_i, \ E = \sum_{i=1}^{N} x_i$$ (Equation 2)

$$a_t = \frac{N*D - C*E}{N*B - E*E}, \ b_t = \frac{B*C - D*E}{N*B - E*E}$$

(5) Determining Unit Vector $P_a$ (S46)

In the step (S46) for determining the unit vector $P_a$, a straight line and the unit vector $P_a$ thereof are determined in the workpiece coordinate system.

When $a_t=0$ (or $\approx 0$)

The traveling direction vector $P_a$ is set to the vector $u_1$ plus three-dimensional coordinates with the third-axis value being zero.

When $a_t<0.001$, at is set to zero.

Basically, approximation is possible for straight lines.

The unit vector $P_a$ is converted from the workpiece coordinate system to a machine coordinate system.

When $a_t \neq 0$

The unit matrix on the straight line in the workpiece coordinate system is obtained.

The coordinates in the workpiece coordinate system, corresponding to two points $(0, b_t)$ and $(-b_t/a_t, 1)$ in the path coordinate system, are calculated by inverse conversion by the following Equation 3.

$$\begin{pmatrix} x1 \\ y1 \end{pmatrix} = \begin{pmatrix} u_x & -u_y \\ u_y & u_x \end{pmatrix} \begin{pmatrix} 0 \\ b_t \end{pmatrix} = X_1 \text{ (vector)}$$ (Equation 3)

$$\begin{pmatrix} x2 \\ y2 \end{pmatrix} = \begin{pmatrix} u_x & -u_y \\ u_y & u_x \end{pmatrix} \begin{pmatrix} -b_t/a_t \\ 0 \end{pmatrix} = X_2 \text{ (vector)}$$

The unit vector $u_2$ on the straight line passing through the foregoing two points is expressed by the following Equation 4.

$u_2$(unit sector)=$(X_2-X_1)/|X_2-X_1|$ (Equation 4)

(6) Correct Path Reference Direction ($P_a$)

The correct path reference direction ($P_a$) is determined in the following way.

When the inner product ($u_1$, $u_2$) of vectors $u_1$ and $u_2$ is negative, $u_2$ is set to $-u_1$.

Then, $P_a$ is set to the vector $u_2$ plus three-dimensional coordinates with the third-axis value being zero.

$P_a$ is converted from the workpiece coordinate system to the machine coordinate system.

Final Traveling Direction (P) (S34)

The step (S34) for determining the final traveling direction (P) will be described next in more detail.

(1) When the Current Deflection ($E_b$) of the Scanning Probe is Close to the Reference Deflection (E) or Excessive Probe Deflection Occurs ($3E/4 \leq |E_b|$)

The fundamental equation for the final scanning traveling direction vector (P) is shown below.

$P=(1-m) \cdot P_b + m P_a$ where m indicates a weight parameter ($0 \leq m \leq 1.0$).

The weight parameter m is determined in the following way.

$m=\text{Min}(m_1, m_2)$ which means that m is the smaller of $m_1$ and $m_2$.

Figure 11:
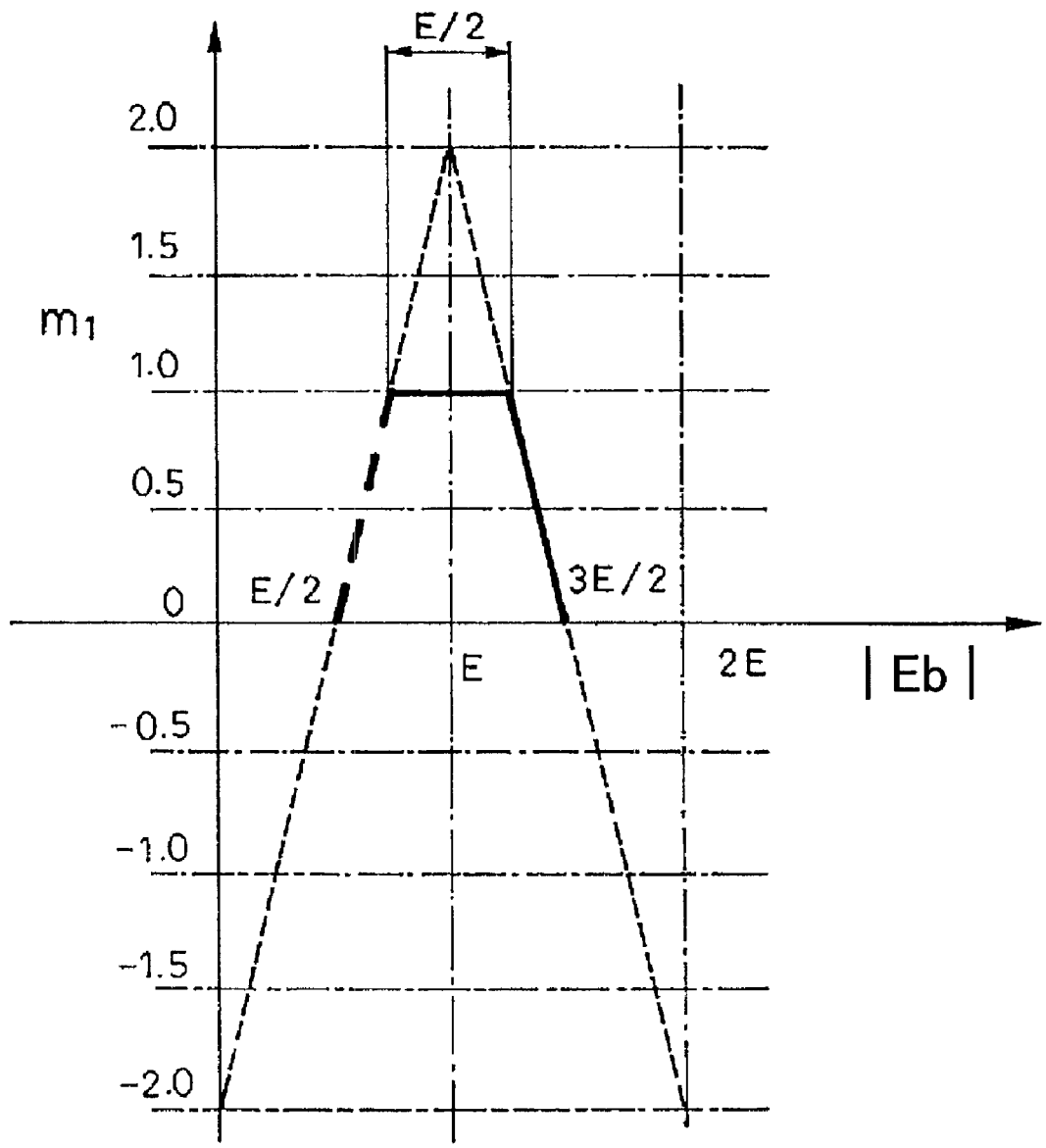
FIG. 11 is an example method performed by the controller shown in FIG. 6 for determining the combination ratio of the probe path reference method and the probe deflection reference method.

$m_1$ is determined according to the current deflection ($E_b$) of the scanning probe, as shown in FIG. 11.

Figure 12:
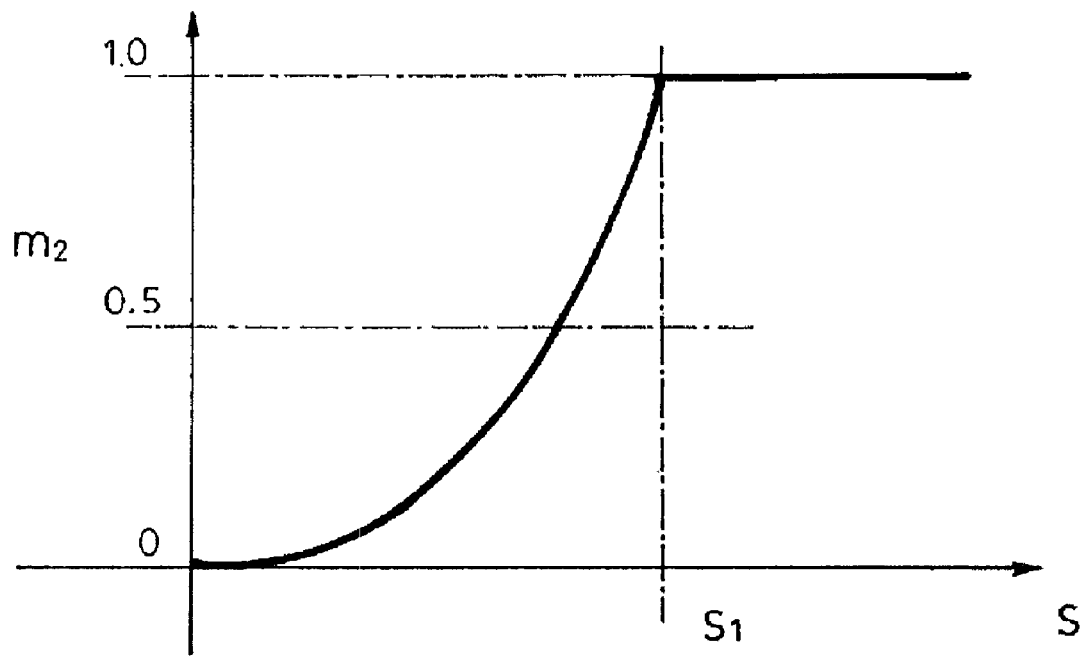
FIG. 12 is another example method performed by the controller shown in FIG. 6 for determining the combination ratio of the probe path reference method and the probe deflection reference method.

$m_2$ is determined according to the ratio S ($=L/L_0$) of the current speed movement distance L to the specified speed movement distance $L_0$ of the scanning probe, as shown in FIG. 12.

(2) When the Current Deflection ($E_b$) of the Scanning Probe is Separated by a Large Distance ($|E_b|<3E/4$)

As the final traveling direction (P), the path reference direction ($P_a$) obtained by the probe path reference method is used.

If a return movement occurs due to a lack of damper oil inside the scanning probe 12, no problem occurs because a direction can be selected such that the inner product of the direction and the traveling direction immediately before is positive.

To handle a sudden change that occurs at separation, the following process is performed.

If the range of all points exceeds 100 μm, points located within 100 μm of the first point are multiplied by a weight coefficient of 0.5 to increase the weight for points located close to the last point, and then, all the points are used to calculate a straight line by the least squares method.

As a result, when the probe is separated from the workpiece at a corner, the influences of points before the corner can be reduced.

As described above, according to the scanning measurement instrument of the present embodiment, to perform autonomous scanning control, the probe path reference method and the probe deflection reference method are used together. In the probe path reference method, multiple past tip center positions with respect to the current tip center position are used to determine an approximate straight line by the least squares method, and the direction of an extension of that line is determined as the traveling direction. In the probe deflection reference method, the direction of a vector obtained from the outer product of the scanning traveling direction vector and the normal vector of the specified scanning restraining section is set as the probe deflection direction.

As a result, even at a large curvature or at a special measurement surface, scanning measurement can be performed at high speed with high accuracy.

Because the traveling direction and the probe deflection direction of the scanning probe can be set and controlled more accurately in the present embodiment, this embodiment is especially effective for a scanning probe having a small permissible probe deflection range because out-of-permissible-range errors can be reduced.

Modifications

As the probe deflection unit 34, the moving unit 32 may be used. Alternatively, the moving unit 32 and an angle change unit, disposed between the Z-axis spindle 26 and the scanning probe 12 may be used. The angle change unit can change the angle (orientation) of the scanning probe 12.

In the above embodiment, a scanning probe of the type using probe deflection distance constant control is used. The scanning probe of the present invention is not limited to this type. A probe of the type using measurement pressure constant control can also be used.

What is claimed is:

1. A scanning measurement instrument for performing autonomous scanning measurement while making a spherical tip contact a measurement surface of a workpiece, the instrument comprising:
    a scanning probe, the scanning probe comprising:
        a probe body;
        the spherical tip, which contacts the workpiece; and
        a stylus supported in a deflective manner with respect to the probe body and connected to the tip at an end;
    a moving unit for moving the workpiece and the scanning probe relative to each other such that a contact position of the measurement surface and the tip is moved along the measurement surface;
    a movement distance detection unit for detecting the movement distance of the scanning probe moved by the moving unit;
    a deflection detection unit for detecting the deflection of the stylus with respect to the probe body;
    a data processor for calculating the coordinates of the center position of the tip according to the movement distance of the scanning probe detected by the movement distance detection unit and the deflection of the stylus detected by the deflection detection unit;
    a path information holding unit for holding information about a path of the center position of the tip during the autonomous scanning measurement performed with the scanning probe, the path being, with respect to the center position of the tip, from a center position of the tip immediately before the center position of the tip, to a center position of the tip located a predetermined measurement pitch before the center position of the tip, in the direction opposite a movement direction of the scanning probe;
    a path reference direction setting unit for calculating an approximate straight line direction from the information about the path of the center position of the tip stored in the path information holding unit to set the direction as a path reference direction;
    a traveling direction setting unit for setting the path reference direction set by the path reference direction setting unit as a traveling direction of the scanning probe;
    a movement control unit for controlling the relative movement of the scanning probe moved by the moving unit such that the scanning probe is moved in the traveling direction set by the traveling direction setting unit; and
    a normal direction setting unit for setting the normal direction of the measurement surface according to the direction of a vector obtained from the outer product of a vector indicating the traveling direction set by the traveling direction setting unit and a normal vector of a scanning restraining section specified in advance.

2. A scanning measurement instrument according to claim 1, wherein the data processor applies offset processing according to the radius of the tip to the coordinates of the center position of the tip in the normal direction set by the normal direction setting unit to calculate the coordinates of the contact position of the measurement surface and the tip.

3. A scanning measurement instrument according to claim 1 further comprising a deflection reference direction setting unit for setting, as a deflection reference direction, the direction of a vector obtained from the outer product of a vector in a probe deflection direction obtained according to the deflection of the stylus detected by the deflection detection unit and a normal vector of a scanning restraining section specified in advance, and
    Wherein the traveling direction setting unit switches the traveling direction of the scanning probe according to amount of a change in a predetermined monitoring item between the path reference direction set by the path reference direction setting unit and the deflection reference direction set by the deflection reference direction setting unit.

4. A scanning measurement instrument according to claim 3, wherein the traveling direction setting unit monitors, as the monitoring item, at least one of the current deflection of the stylus detected by the deflection detection unit and the ratio of the current speed movement distance with respect to a specified speed movement distance of the scanning probe obtained according to the movement distance of the scanning probe detected by the movement distance detection unit.

5. A scanning measurement instrument according to claim 1 further comprising a deflection reference direction setting unit for setting, as a deflection reference direction, the direction of a vector obtained from the outer product of a vector in a probe deflection direction obtained according to the deflection of the stylus detected by the deflection detection unit and a normal vector of a scanning restraining section specified in advance, and
    Wherein the traveling direction setting unit combines a vector indicating the path reference direction set by the path reference direction setting unit and a vector indicating the deflection reference direction set by the deflection reference direction setting unit at a ratio determined according to amount of a change in a predetermined monitoring item to set the traveling direction.

6. A scanning measurement instrument according to claim 5, wherein the traveling direction setting unit monitors, as the monitoring item, at least one of the current deflection of the stylus detected by the deflection detection unit and the ratio of the current speed movement distance with respect to a specified speed movement distance of the scanning probe obtained according to the movement distance of the scanning probe detected by the movement distance detection unit.

* * * * *